Nov. 2, 1926.
A. (G) S. BAXTER
1,605,203
AUTOMATIC FRIED CAKE MACHINE
Filed July 2, 1921    2 Sheets-Sheet 1
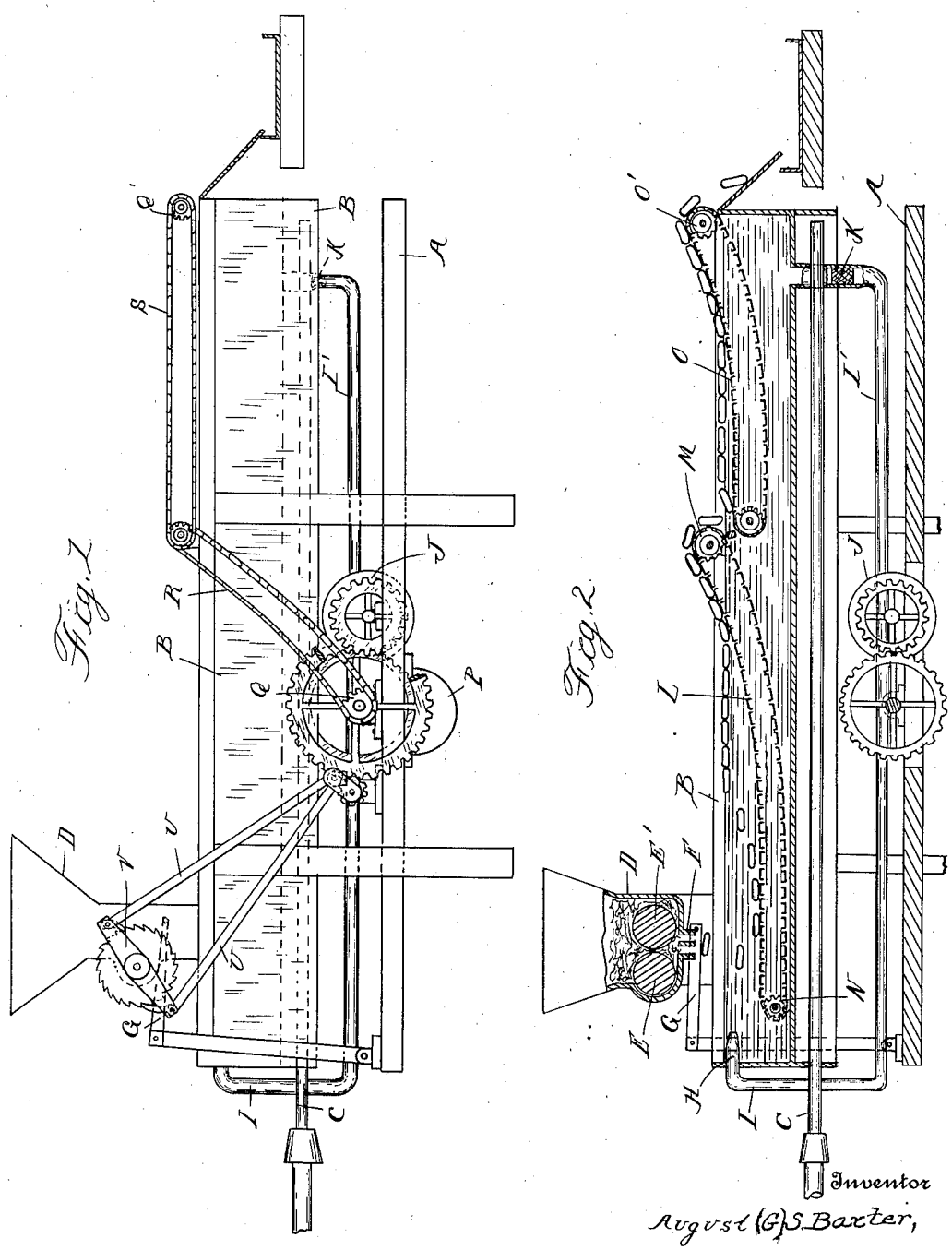
Inventor
August (G) S. Baxter,
By Whittemore Hulbert Whittemore
 & Belknap    Attorneys

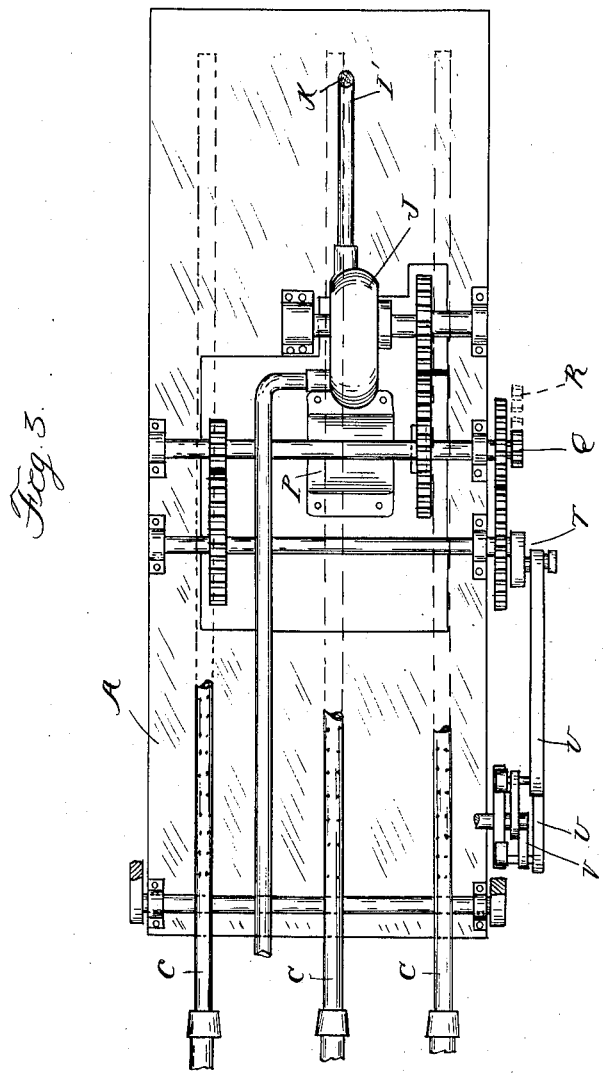

Patented Nov. 2, 1926.

1,605,203

UNITED STATES PATENT OFFICE.

AUGUST (G) S. BAXTER, OF DETROIT, MICHIGAN, ASSIGNOR TO MILLS BAKING COMPANY, OF DETROIT, MICHIGAN, A CORPORATION OF MICHIGAN.

AUTOMATIC FRIED-CAKE MACHINE.

Application filed July 2, 1921. Serial No. 482,111.

The invention relates to automatic machines for making fried cakes and has for its object; first, high quality of product; second, high rate of production; and third, a practical construction which is easily maintained in operative condition and is easily adjusted for variations in the product desired. With these objects in view the invention consists in the construction as hereinafter set forth.

In the drawings:

Figure 1 is a side elevation of the machine;

Figure 2 is a vertical central longitudinal section thereof;

Figure 3 is a horizontal section.

In the present state of the art fried cake machines have been devised in which the rings of dough are cut and dropped into the hot fat from a dough feeding and cutting machine. It is necessary, however, that the cakes should be fried on both sides, which requires either the turning of them over in the fat or holding them immersed beneath the surface. It is further necessary to feed the frying cakes out of the path of the dropping dough rings and various constructions have been employed for accomplishing the several results. Thus in certain constructions the cakes are held submerged by a traveling conveyor above the same and by which they are progressively advanced until ready to be discharged from the fat. The objection to this is that contact with the dough ring during frying interferes with its natural growth or expansion and the quality of the resulting product. Another defect of machines heretofore used is the fouling of the fat by the accumulation of sediment and the broken fragments of the cakes, etc.

With my improved construction the dough rings, when dropped into the fat, are left free from contact to grow or expand naturally and are permitted to float to the surface, as is usual when fried in a kettle. At the same time provision is made for constantly advancing the cakes to keep up a high rate of production and for turning them over so that both sides are properly browned. This I accomplish by establishing a traveling surface current in the fat which carries the cakes along with it and by subsequently picking the cakes up on a conveyor; which functions to over-turn the same, there is further provision for feeding the over- turned cakes forward and for finally discharging the same when fully fried. Still another feature of my improvement is a constant circulation of the hot fat and of passing the same through a strainer, which removes all impurities before returning to the tank.

In detail, A is a suitable framework upon which is mounted a long tank or vat B containing the fat, which is maintained at proper temperature by burners C therebeneath. D is a dough feeding and cutting machine of any suitable construction, which is mounted over one end of the tank and is automatically operated to simultaneously discharge a series of dough rings extending transversely of the tank. As specifically shown, the dough is fed by rolls E, E' and is forced out through ring dies F in the form of tubes severed into rings by a reciprocating cutter G. At the same end of the tank at which the dough cutter is located there is arranged a transversely extending nozzle H having a series of jets therein directed longitudinally of the tank. This nozzle is connected by a conduit I with a centrifugal pump J having its suction end I' connected with the opposite end of the tank. In this suction end is arranged a suitable strainer K, with the result that the fat which is in the tank is constantly circulated through the conduit I and is discharged in a series of jets at the surface of the liquid in the tank and directed longitudinally thereof. Thus the jets will establish a surface current flowing from the dough cutter towards the opposite end of the tank, which current will feed the cakes forward as soon as they rise to the surface.

When the dough rings are first dropped into the fat, their specific gravity is greater than that of the liquid, so that they will sink to the bottom. To prevent an accumulation of the cakes directly beneath the cutter, provision is made for mechanically feeding them forward until they are sufficiently light to rise to the surface. This, as shown, consists of a conveyor L which lies adjacent to the bottom of the tank in the portion thereof beneath the cutter and which in the central portion of the tank rises above the surface and passes about driving sprockets M. The opposite end of the conveyor passes around an idler sprocket N which is in the forward part of the tank. This conveyor is constantly driven and is so timed that it will advance the dough rings dropping thereon to clear the next cut rings dropping through the fat. The rings will rest upon the conveyor until they become lighter than the fat, but the momentum imparted thereto will cause their continued forward feeding while rising to the surface, after which the surface current established by the jets H will carry them onward. The rate of flow of this current is also timed to that of the conveyor and to the dough feed, so that there is no clogging or interference between cakes and the whole series is constantly advanced. At the point where the conveyor L rises above the surface of the fat the cakes will be lifted and fed forward until they drop over the sprockets M. The velocity acquired in the fall will carry them below the surface of the fat. Clogging is prevented at this point by a second conveyor O which travels forward at the same rate and sufficiently below the surface to permit the cakes to float thereabove. However, the cakes in first dropping will contact with the conveyor and are given a propelling movement by the fat which causes the cakes to overturn. The cakes being lighter than the fat will then rise to the surface and will be fed forwardly by the fat until they are again drawn out of the fat by the upwardly-extending portion of the conveyor O. With both the conveyors L and O the cakes, when drawn out from the fat, will be permitted to drain the liquid running between the slats of the conveyor back into the tank. From the end of the conveyor O the cakes are discharged and may be carried away by any suitable means.

For driving and timing the apparatus suitable mechanism is provided which, as shown, comprises the motor P with connecting step-down gearing for driving the pump J and a sprocket Q which drives a chain R for communicating motion to the sprockets M. A chain S also transmits motion to the sprockets O' which drive the chain O. A crank T is driven by the mechanism and is connected by the rods U with ratchet levers V imparting an intermittent movement to a ratchet wheel W on the cutter D. The throw of the crank T is adjustable and this will alter the rate of feed of the dough for cakes of different size. Also the timing of the conveyors and pump may be varied to suit the requirements of the work.

What I claim as my invention is:

1. In a frying machine, the combination with a tank or receptacle for the heated fat, of a pair of conveyors in longitudinal series, one conveyor having a portion located a considerable distance below the surface of the fat, the other of said conveyors having a portion located adjacent to the surface of the fat, each conveyor having a portion at the discharge end rising above the surface, means for feeding dough cakes into the receptacle and upon the first of said conveyors by which said cakes are advanced while in a non-buoyant condition, means for establishing a current in the fat for continuing the advancement of said cakes when buoyancy is attained and for delivering the same upon the rising portion of said conveyor by which they are over-turned into the tank above the second conveyor, the rising portion of the latter discharging said cakes from the tank.

2. A frying machine comprising an elongated tank or receptacle for the heated fat, a pair of conveyors within said receptacle below the surface of the fat, one of said conveyors being located a considerable distance below the surface of the fat, said conveyors being arranged in longitudinal series and each being provided at its discharge end with a portion rising above the surface of the fat, means for feeding dough cakes into said receptacle above the first conveyor by which said cakes are advanced while in a non-buoyant condition, means for creating a current in the fat to continue the advancement of the cakes when buoyancy is attained and to deliver the same on the rising portion of said first conveyor, said portion overturning the cakes above the second conveyor, said second conveyor functioning to continue the advancement of the cakes and to alternately discharge the same.

In testimony whereof I affix my signature.

AUGUST (G) S. BAXTER.